(12) United States Patent
Mestha et al.

(10) Patent No.: US 8,711,429 B2
(45) Date of Patent: Apr. 29, 2014

(54) SYSTEMS AND METHODS FOR PRINTING IMAGES OUTSIDE A NORMAL COLOR GAMUT IN IMAGE FORMING DEVICES

(76) Inventors: Lalit K. Mestha, Fairport, NY (US);
Tonya L. Love, Rochester, NY (US);
Ta-Chen Hsu, San Gabriel, CA (US);
Patricia J. Donaldson, Pittsford, NY (US)

( * ) Notice: Subject to any disclaimer, the term of this patent is extended or adjusted under 35 U.S.C. 154(b) by 2505 days.

(21) Appl. No.: 11/099,589

(22) Filed: Apr. 6, 2005

(65) Prior Publication Data
US 2006/0227395 A1 Oct. 12, 2006

(51) Int. Cl.
G03F 3/08 (2006.01)
H04N 1/60 (2006.01)

(52) U.S. Cl.
USPC ............ 358/1.9; 358/518; 358/504; 358/523; 358/524; 358/520; 382/167; 382/162

(58) Field of Classification Search
USPC ............................ 358/518, 1.9, 504; 382/167
See application file for complete search history.

(56) References Cited

U.S. PATENT DOCUMENTS

| | | | |
|---|---|---|---|
| 5,749,021 A | 5/1998 | Mestha et al. | |
| 5,950,040 A | 9/1999 | Mestha et al. | |
| 5,987,168 A * | 11/1999 | Decker et al. | 382/167 |
| 6,344,902 B1 | 2/2002 | Duke et al. | |
| 6,525,721 B1 * | 2/2003 | Thomas et al. | 345/600 |
| 7,466,446 B2 * | 12/2008 | Arakawa | 358/1.9 |
| 2002/0163570 A1 | 11/2002 | Phillips | |
| 2003/0039479 A1 | 2/2003 | Takahashi | |
| 2003/0202194 A1 * | 10/2003 | Torigoe et al. | 358/1.9 |
| 2006/0007510 A1 * | 1/2006 | Nishide et al. | 358/518 |

FOREIGN PATENT DOCUMENTS

| | | |
|---|---|---|
| EP | 1 292 102 A2 | 3/2003 |
| JP | A 2002-112057 | 4/2002 |

OTHER PUBLICATIONS

Sohail A. Dianat et al.; "Dynamic Optimization Algorithm for Generating Inverse Printer Maps with Reduced Measurements"; submitted for publication in the IEEE Conference on Decision and Control; 2005.

* cited by examiner

Primary Examiner — Quang N Vo

(57) ABSTRACT

A user of an image forming device selects from among a plurality of pre-stored color rendition dictionaries (CRDs) in order that a set of system process parameter setpoints associated with that CRD may be referenced to bias and/or skew an available color gamut in the direction of a particular nominally out-of-gamut color which the user wishes to produce in a color image output by the image forming device. A capability is included in a color image forming device store and/or update multiple sets of special process parameter setpoints defining a plurality of CRDs each of which may be identified and associated with a specific color in order that requests to print out-of-gamut colors may be satisfied routinely as exceptions to a nominal gamut based on a nominal set of stored setpoints when a CRD is selected and the setpoints associated with that CRD are input for reference by the color image forming device on a temporary basis.

21 Claims, 2 Drawing Sheets

SYSTEMS AND METHODS FOR PRINTING IMAGES OUTSIDE A NORMAL COLOR GAMUT IN IMAGE FORMING DEVICES

BACKGROUND

This disclosure is directed to providing a user with an ability to select an offset gamut or gamut bias for producing at least one vibrant color in a multi-color image, produced in an image forming device.

The color gamut of a printer is a multi-dimensional space of a given volume with the axes of the space being set or defined initially by the pigments used in the colorants of the primary colors such as, for example, cyan, magenta, yellow, and black. In forming multi-color output images on an image-receiving medium, each of the primary colors is transferred to the image-receiving medium in turn. The color gamut is defined by the interaction of the primary colors, and is limited by a total amount of toner in any combination that can be effectively deposited on the image-receiving medium. For each system, the toner deposited on the image-receiving medium, such as a photoreceptor, is referred to as DMA (Developed Mass per unit Area). Otherwise, toner transfer to the image-receiving medium will be affected, and the quality of the produced images will be reduced.

The actual available color gamut for a particular image forming device not only depends on colorants of the pigments but it is also a function of DMA. The DMA depends on the setpoints for certain process parameters of each of the separations. The process parameters are, for example, photoreceptor voltages (charged and/or discharged voltages), donor and/or magnetic roll voltages, toner concentrations and the like.

Combinations of setpoints affect DMA levels thereby defining limits to the color gamut by limiting the developed color combinations that are available from specific mass levels of each of the primary colorants. These setpoints are developed in sets, the sets of setpoints and associated color rendition dictionary (CRD) by which images may be produced by the image forming device. CRDs, and their associated setpoints, are generally experimentally derived for a given image forming device or system. CRDs are appropriately nominalized in order that the CRD and associated set of setpoints programmed into an image forming device, or family of image forming devices, substantially ensures that the color gamut produced by that image forming device covers, as broadly as possible, an available nominal color spectrum. Typically then, image forming devices are delivered with a single CRD available in the image production system which is defined by the associated setpoints adjusted in order to center the color gamut.

SUMMARY

Often, customers or other end-users of an individual image forming device, or family of image forming devices, may desire to produce and/or reproduce, on a recurring basis, a color or set of colors that lies outside the nominal color gamut available based on the single CRD that comes pre-stored in the image forming device. CRDs and individual process parameter setpoints are not, however, user adjustable. Where a user is provided access to a capability in an image forming device to adjust individual setpoints, CRDs would be rendered invalid. A likely outcome would be that the color gamuts available to produce output images would be adversely affected.

Producers and suppliers of image forming devices have a capability to experimentally bias and/or skew the color gamut available in their products. Through experimentation, a new CRD may be defined based on a modified set of setpoints to adjust the color gamut of an image forming device. In such a case, the total volume of the color gamut available from the image forming device is not increased, but it is shifted or skewed. The library of available colors, however, is modified in order that a different or more vibrant single color-based output set of hues (e.g., vibrant red or vibrant blue) may be made available at the expense of potentially available pallets of other hues, (e.g., green and blue hues) to be produced and/or reproduced within the skewed color gamut defined by this modified color rendition dictionary. Using such a skewed gamut at multiple sets of setpoints, effective color gamut is increased or extended beyond the nominal gamut.

Conventionally, highly-technically trained maintenance personnel are required to go to the customer and/or end-user site to load the newly produced CRD thereby modifying the setpoints within a given image forming device in accordance with the customer and/or end-user desires. Once reset, the image forming device would then only be able to produce and/or reproduce images according to this single skewed color gamut.

It would be advantageous to provide a capability within an image forming device, or family of image forming devices, whereby a user could select from among a plurality of CRDs resulting in temporary selection of an other-than-nominal, individually determined set of setpoints. Such selection may skew the color gamut available in the image forming device for a particular image production and/or reproduction job in which the customer and/or end-user desires a specifically biased color set at the expense of certain other colors within a color gamut.

Exemplary embodiments of the disclosed systems and methods may provide a customer and/or end-user of an image forming device a capability to select from among a plurality of multi-dimensional CRDs in order to temporarily adjust a set of process parameter setpoints associated with that CRD in the image forming device. The result of such selection may skew the color gamut available from the image forming device for a particular image production and/or reproduction job.

Exemplary embodiments of disclosed systems and methods may provide an ability to extend a printer color gamut along one axis within the multi-dimensional space defined by the color gamut, with the sacrifice of some capability along other axes, based on customer and/or end-user selection of one of a plurality of sets of process parameter setpoints associated with a plurality of CRDs stored in an image forming device.

Exemplary embodiments of disclosed systems and methods may provide an ability to store and/or update sets of special process parameter setpoints defining a plurality of CRDs. Each CRD may be identified and associated with a specific color in order for requests to print out-of-gamut colors to be satisfied routinely as exceptions to a nominal color gamut based on a nominal set of stored process parameter setpoints.

Exemplary embodiments of disclosed systems and methods may provide the ability that when an alternate CRD is selected, the set of process parameter setpoints associated with that CRD are automatically input for reference and the process parameters adjusted by the image forming device on a temporary basis.

Exemplary embodiments of disclosed systems and methods may provide a customer and/or end-user an ability at that individual customer and/or end-user's discretion to bias and/or skew a color gamut within an image forming device in a pre-defined direction in order that the customer and/or end-user may obtain a specific color that would otherwise not have been available.

Exemplary embodiments of disclosed systems and methods may provide the potential for significant color gamut shift within an image forming device between image production and/or reproduction jobs, or alternatively within an individual image production and/or reproduction job such as, for example, on a page-by-page basis.

These and other features and advantages are described in, or apparent from, the following detailed description of various exemplary embodiments of systems and methods according to this disclosure.

BRIEF DESCRIPTION OF THE DRAWINGS

Various exemplary embodiments of disclosed systems and methods for color gamut extension in an image forming device will be described, in detail, with reference to the accompanying figures, wherein.

DETAILED DESCRIPTION OF EMBODIMENTS

The following description of various exemplary embodiments of systems and methods for color gamut skewing within an image forming device may refer to one specific type of image forming device, such as an Image-on-Image (IOI) printer, for the sake of clarity, familiarity and ease of description. However, it should be appreciated that the disclosed principles may be equally applied to any image forming device that is usable to produce and/or reproduce color images particularly as hard-copy output images on an image-receiving medium. Such devices may include, but are not limited to, copiers, printers, scanners, facsimile machines, xerographic image forming devices, and/or any other now known or later-developed system or device for producing, reproducing and/or potentially transmitting or receiving color images.

Various exemplary embodiments of disclosed systems and methods allow a customer and/or end-user of an image forming device to select from among a plurality of pre-stored color rendition dictionaries (CRDs) in order that a set of system process parameter setpoints associated with, or that define, that CRD may be referenced to extend, bias and/or skew (hereinafter "skew") an available color gamut in the direction of a particular nominally out-of-gamut color which a customer and/or end-user wishes to produce and/or reproduce in a color image output by an image forming device.

Figure 1:
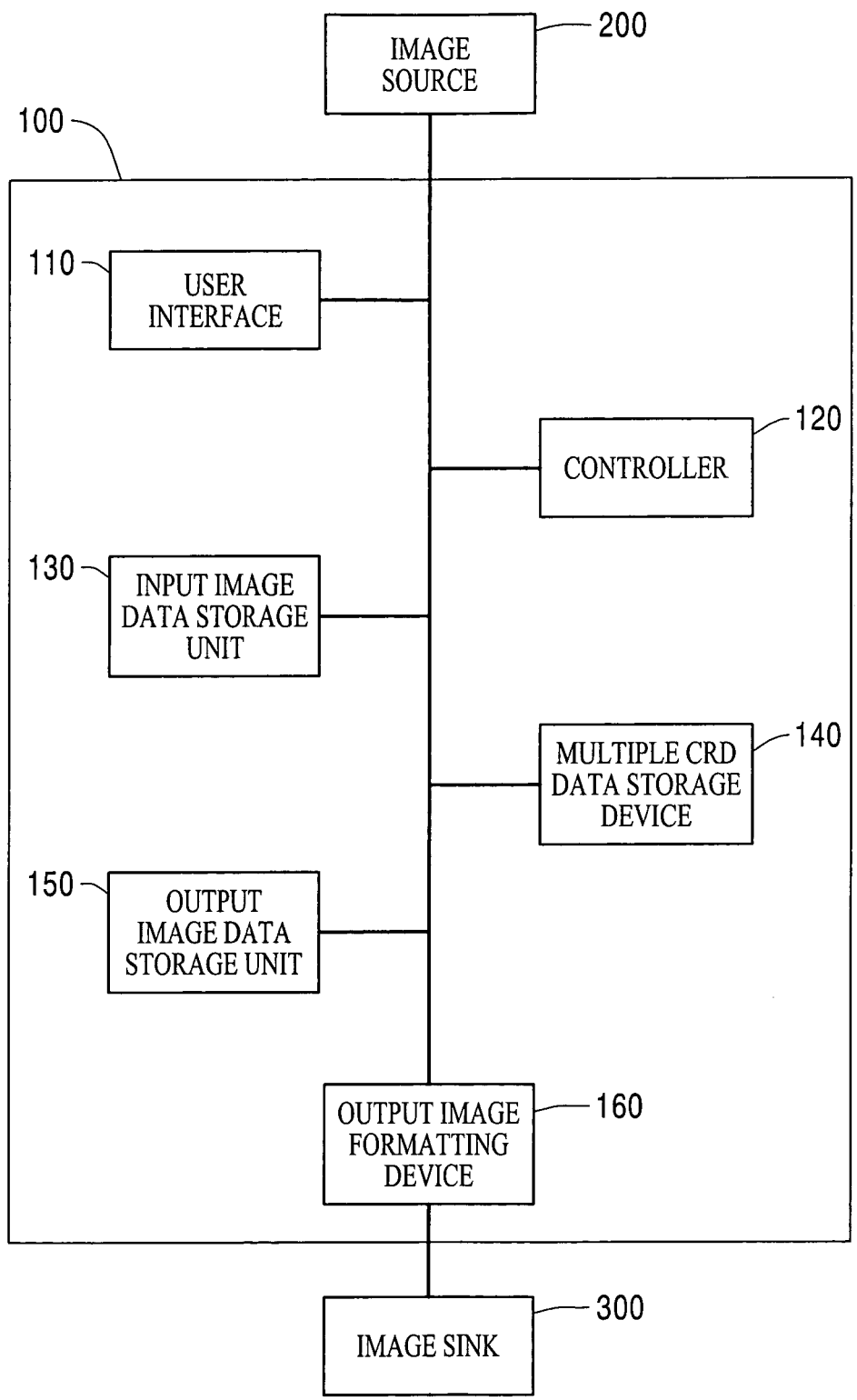
FIG. 1 illustrates a functional block diagram of an exemplary system for performing color gamut skewing within an image forming device.

FIG. 1 illustrates a functional block diagram of an exemplary system for performing color gamut skewing within an image forming device 100. As shown in FIG. 1, an image forming device 100 is connected to, and communicates with, an image source 200 and an image sink 300. Although shown as separate elements, it should be appreciated that the image forming device 100 may include one or both of the image source 200 and the image sink 300 as integral components of the image forming device 100.

The exemplary image forming device 100 further includes a user interface 110, a controller 120, at least one image data storage unit (depicted in FIG. 1 as an input image data storage unit 130 and an output image data storage unit 150), a multiple CRD data storage device 140, and an output image formatting device 160, all connected via a data/control bus 170. The data/control bus may also be usable to connect the image forming device 100 to the image source 200 and the image sink 300.

In various exemplary embodiments of disclosed systems and methods, an input image may be obtained via the image source 200. The image source 200 may be any form of image receiving and/or forming device such as, for example, an image scanning device, an image digital data storage device, a digital still or video camera, and/or a locally or remotely located computer and/or data manipulation workstation, or any other now known or later-developed device that is capable of generating or reproducing electronic digital source image data. The image source 200 can be integrated with, or connected remotely to, the image forming device 100. The image source 200, if a separate device or unit from the image forming device 100, may be connected to the image forming device 100 by either a direct or a network data communication link, including any one or more of a wired, wireless and/or optical link.

It should be appreciated that, although the image forming device 100 may produce an output color image from electronic image data that has been generated within, a digital data generating device such as, for example, a computer workstation or system, this disclosure is not limited to such an application.

The image source 200 may include a capability to store input image data. Alternatively, as depicted in FIG. 1, the image forming device 100 may internally store input image data in, for example, an input image data storage unit 130.

In exemplary embodiments of disclosed systems and methods, a plurality of CRDs which are associated with individual sets of system process parameter setpoints are stored within the image forming device 100. The CRDs may include a look-up table for off-normal-gamut, out-of-gamut, or other non-standard gamut color image production and/or reproduction operations. The CRDs may, for example, be stored in a multiple CRD data storage device 140. The CRDs are designed to allow pre-programmed modification of certain system process parameter setpoints in order to skew the available color gamut of the image forming device 100 in a direction that may be individually selected by a customer or other end-user, (hereinafter "user"). The user may be able to select an alternate CRD by manipulating information available through the user interface 110, or the image source 200.

A user may be presented with an option whereby the user can select a nominal color gamut or a color gamut which is skewed along an axis, by selecting from a plurality of menu choices presented on, for example, a graphical user interface (GUI) as an example of the user interface 110. Once the user makes a selection via the user interface 110 or otherwise, the controller 120 selects the CRD associated with the user's selection from a plurality of CRDs stored within the image forming device such as, for example, within a multiple CRD data storage device 140. With reference to the selected CRD, the controller 120 modifies the process parameter setpoints of the image forming device 100 in order to produce output images according to the skewed color gamut selected by the user. Such a controller 120 as well as other involved components may, for example, reside in a Digital Front End (DFE) of an IOI printer.

The stored system process parameter setpoints associated with each CRD may include settings for virtually any process parameter within the image forming device 100 such as, for example, photoreceptor charge voltage, photoreceptor discharge voltage, donor roll voltage, magnetic roll voltage, toner concentration, or other like adjustable system process parameter.

It should be appreciated that the plurality of CRDs with associated process parameter setpoints may be pre-installed within an image forming device 100. Alternatively, a stored library of CRDs may be updated, or expanded, or changed completely by providing requisite CRDs and associated sets of setpoint data on a digital data storage medium. Such digital data storage medium may include, for example, a CD, a DVD, a computer disk, a memory stick or card, a digital information card or plug, or any other now known or later-developed digital data storage medium. The information may be loaded into the image forming device 100 to replace, update and/or expand the stored CRD and setpoint data housed in, for example, a multiple CRD data storage device 140, via a compatible digital data storage medium reading device. The compatible digital storage reading device may be integral to the user interface 110, to the image source 200, or may be a stand-alone device (not shown) connected to the data/control bus 170 or otherwise to the image forming device 100 by any wired, wireless or optical digital data transmission capability.

It should be appreciated that, given the required inputs, software algorithms, hardware circuits, or any combination of software and hardware control elements may be used to implement the individual devices and/or units in the exemplary image forming device 100, and specifically the multiple CRD data storage device 140, in order to provide a user with a plurality of CRDs yielding an ability of the image forming device 100 to produce images based on a user selectable skewed color gamut.

It should be appreciated that each of the devices and/or units depicted in FIG. 1 as internal to, or alternatively externally connected to, the exemplary image forming device 100, could be either units and/or capabilities internal to the image forming device 100, or individually, or in combination, attached as separate units by any path which facilitates digital data communication and coordination between such units and devices such as, for example, one or more of a wired, a wireless, and/or an optical connection.

In various exemplary embodiments of disclosed systems and methods, a single user interface 110 could be used to control all of the separate devices, or such control may exist, for example, at the image source 200.

In various exemplary embodiments of disclosed systems and methods, a user selects from among a plurality of stored CRDs based on that individual user's desires regarding which color gamut may best produce a desired output color image in a hard-copy document. The selection may require a user to print a "test", or other representative, color output image associated with each of the plurality of stored CRDs.

Once the user has selected the CRD which the user wants associated with the produced output color image, the image forming device 100 may store the output color image, and information pointing to the CRD to be associated with that output color image in, for example, an output image data storage unit 150.

In various exemplary embodiments of disclosed systems and methods, once the user has selected the CRD and presented the image to be produced and/or reproduced, and has separately directed the manner in which the user would like for that image to be produced and/or reproduced via, for example, the image source 200 or the user interface 110, the image forming device 100 automatically formats the output color image with the associated CRD via, for example, an output image formatting device 160 for presentation to a compatible image sink 300.

The image sink 300 preferably contemplated by this disclosure is a hard-copy document production device. It should, however, be appreciated that disclosed systems and methods are not limited to such an application. In general, the image sink 300 may be any device that is capable of outputting the processed output color image generated by the image forming device, such as, for example, a printed image, a copied image, or any other hard-copy output image, an image on a digital display device, image data exportable to a transportable memory device or digital data storage medium, or any other digital image display capability.

Any of the data storage units depicted, or alternately as described above, may be implemented using any appropriate combination of alterable, volatile or non-volatile memory, or non-alterable, or fixed, memory. The alterable memory, whether volatile or non-volatile, may be implemented using any one or more of static or dynamic RAM, a computer disk and compatible disk drive, a writable or re-writable optical disk and associated disk drive, a hard drive, a flash memory, or any other like memory medium and/or device. Similarly, the non-alterable or fixed memory can be implemented using any one or more of ROM, PROM, EPROM, EEPROM, an optical ROM disk, such as a CD-ROM or DVD-ROM disk, and compatible disk drive, or any other like memory storage medium and/or device.

Figure 2:
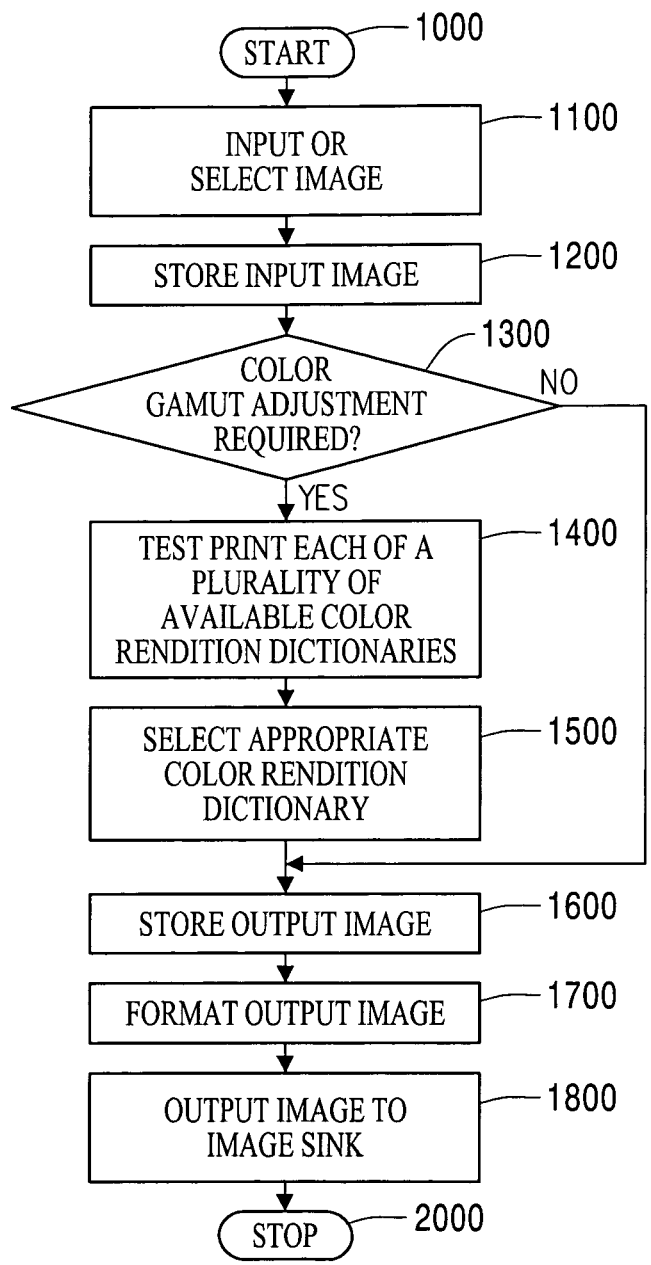
FIG. 2 is a flowchart of an exemplary method for performing color gamut skewing with regard to images produced and/or reproduced in an image forming device.

FIG. 2 is a flowchart of an exemplary method for performing color gamut skewing with regard to images produced and/or reproduced within an image forming device.

As shown in FIG. 2, operation of the method begins at step S1000 and continues to step S1100 where an input image is obtained. The operation of the method continues directly to step S1300 or alternatively to optional step S1200.

In step S1200, input image data is stored in an input image data storage unit for any purpose for which input image data may need to be stored within an image forming device. Such purpose may include, for example, later production/reproduction, image comparison, system calibration and/or any other reason for which such storage may be usable. Operation of the method continues to step S1300.

In step S1300, a determination is made either manually or automatically whether color gamut adjustment is required, in order to that a produced and/or reproduced output image may include off-normal-gamut, out-of-gamut or other non-standard gamut color, prior to producing an output image document.

Generally, this determination will be made by a user rather than by the system itself. It should be appreciated, however, that it is contemplated that disclosed systems and methods may provide a capability whereby skewing of a color gamut in order to produce an improved output color image may be automatically undertaken by a system, unit or device that includes a system and/or method according to this disclosure. For example, a stored code in the image header may instruct the system that color gamut, adjustment is needed to reproduce these images.

If a determination is made in step S1300 that color gamut adjustment is not required, then the operation of the method continues directly to step S1700 or alternatively to optional step S1600.

If a determination is made in step S1300 that color gamut adjustment is required, operation of the method continues directly to step S1500 or alternatively to optional step S1400.

In step S1400, a system, via user input or request, or otherwise automatically, may test print one or more representative output color "test" images using corresponding stored CRDs. Operation of the method continues to step S1500.

In step S1500, a CRD which is manually or automatically deemed appropriate to producing and/or reproducing the output color image, or as otherwise desired by a user, is selected. For example, if optional step S1400 has been performed, or if a plurality of selection options are otherwise presented to the user, then the selection of step S1500 will be performed manually by the user. Operation of the method continues directly to step S1700 or alternatively to optional step S1600.

It should be appreciated that, as discussed above, selection, whether manual or automatic, of a CRD results in modification of a set of process parameter setpoints associated with that CRD by which the image forming device will produce and/or reproduce the output color image which has been selected for production and/or reproduction. Setting of the process parameter setpoints defined by the selected CRD depends on the selection of the appropriate CRD. CRDs with the associated sets of process parameter setpoints will be temporarily or permanently stored within the image forming device in order that, upon selection of a specific CRD, the image forming device internally modifies and/or adjusts the setpoints of selected process parameters. These process parameters, as detailed above, include, but are not limited to, photoreceptor voltages (charged and discharged voltages) donor and magnetic roll voltages, toner concentrations and/or other related process parameters.

In step S1600, the output image may be stored. Such storage may facilitate any desired purpose such as, for example, later production and/or reproduction, image comparison, system calibration and/or any other reason for which storage of an output image may be usable. Such storage may include association of the specific CRD, determined in step S1500, that is to be used when such output image is produced, with the image information. Operation of the method continues to step S1700.

In step S1700, the output color image, with the associated CRD data driving the process parameter setpoints for the production of the output color image, is formatted as may be required to be made compatible with the display and/or image production capabilities of an image sink with which the image forming device is associated, or which the image forming device may include. Operation of the method continues to step S1800.

In step S1800, the output color image, appropriately formatted, is output to the image sink. Operation of the method continues to step S2000 where the operation of the method stops.

It should be appreciated that, although the disclosed systems and methods have been described in conjunction with a conventional color image printing device driven, for example, by a computer or digital data workstation as an image source, the depictions and descriptions are illustrative and not meant to be in any way limiting, particularly not limiting to such a narrow application as any single color image printing device.

It should be further appreciated, that the disclosed systems and methods may also prevent individual user adjustment of any individual process parameter setpoint within an image forming device, to avoid problems such as those discussed above. It should be recognized that characterization of a color gamut, and building or otherwise generating corresponding CRDs with respect to sets of setpoints for process parameters associated with those CRDs, is quite involved. This process is undertaken in order that image forming devices are delivered with nominal sets of setpoints for process parameters in order to cover a nominal color gamut. CRDs with associated sets of setpoints for process parameters of the individual image forming devices with which these CRDs are associated, it is anticipated, will be produced by the manufacturer and/or supplier of the image forming devices and delivered to users either pre-loaded within an image forming device, or otherwise as complete CRDs, or sets of CRDs.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for producing an output color image in an image forming device, comprising:
   obtaining an input color image;
   at least one of, adding color rendition dictionaries to, deleting color rendition dictionaries from, or modifying color rendition dictionaries in, a plurality of color rendition dictionaries stored in the image forming device based on input from a user;
   selecting a color rendition dictionary from among the plurality of color rendition dictionaries;
   setting setpoint values for a plurality of process parameters in the image forming device based on the selected color rendition dictionary; and
   producing an output color image using the image forming device in which the setpoint values have been set,
   wherein the plurality of stored color rendition dictionaries includes at least one color rendition dictionary which is usable to produce a non-standard gamut color in the produced output color image.

2. The method of claim 1, wherein the input image is obtained from a digital color image data file.

3. The method of claim 1, wherein the plurality of process parameters for which setpoint values are set includes at least one of a charged photoreceptor voltage, a discharged photoreceptor voltage, a donor roll voltage, a magnetic roll voltage, or a toner concentration.

4. The method of claim 1, further comprising producing a plurality of test output color images, each based on a different color rendition dictionary among the plurality of stored color rendition dictionaries prior to producing the output color image in the image forming device.

5. The method of claim 1, wherein selecting the color rendition dictionary from among the plurality of color rendition dictionaries comprises a user choosing from among a plurality of options for such selection presented on a user interface for the image forming device.

6. The method of claim 1, wherein adding the color rendition dictionaries to, or modifying the color rendition dictionaries in, the plurality of color rendition dictionaries comprises introducing into the image forming device the color rendition dictionaries to be added or modified as data stored on a digital data storage medium, the data being transferable to the image forming device through a compatible digital data storage medium reading device connected to the image forming device.

7. The method of claim 1, further comprising storing data associated with at least one of the input color image or the output color image in an appropriate data storage unit within the image forming device.

8. A color image forming device including the method of claim 1.

9. A color image printing device including the method of claim 1.

10. A xerographic image reproducing device including the method of claim 1.

11. A digital data storage medium on which is stored a program for implementing the method of claim 1.

12. The method of claim 1, wherein selecting a color rendition dictionary further comprises selecting a color rendition dictionary from among a first color rendition dictionary stored in the image forming device and associated with a first set of setpoint values and a second color rendition dictionary stored in the image forming device and associated with a second set of setpoint values, the first set of setpoint values being different than the second set of setpoint values.

13. A system for producing an output color image, comprising:
   a color image forming device, including or connectable to an image source for generating a color image, including or connectable to an image sink for producing or storing an output color image, including or connectable to a data input device, by which at least one of adding color rendition dictionaries to a plurality of color rendition dictionaries stored in the color image forming device or modifying at least one of the plurality of color rendition dictionaries is undertaken, and including a deleting device for deleting color rendition dictionaries from the plurality of color rendition dictionaries,
   wherein at least one of the plurality of stored color rendition dictionaries is usable for producing output color images that include a non-standard gamut color in a produced output color image, an individual color rendition dictionary is selectable from among the plurality of stored color rendition dictionaries and process parameter setpoint values are adjusted to those associated with the individually selected color rendition dictionary.

14. The system of claim 13, wherein the image source and the image sink are integral components of the color image forming device.

15. The system of claim 13, wherein the process parameter setpoint values are associated with process parameters including at least one of a photoreceptor charged voltage, a photoreceptor discharged voltage, a donor roll voltage, a magnetic roll voltage, and a toner concentration.

16. The system of claim 13, further comprising a user interface, through which a user selects the individual color rendition dictionary.

17. The system of claim 13, wherein the data input device comprises at least one digital data storage medium reading device that is compatible with a digital data storage medium, at least one color rendition dictionary to be added to, or modified in, the plurality of color rendition dictionaries being stored on the digital data storage medium for transfer to the color image forming device via the compatible digital data storage medium reading device.

18. The system of claim 13, wherein the color image forming device further comprises at least one digital data storage unit for storing at least one of input color image data and output color image data.

19. The system of claim 13, wherein the color image forming device comprises a color image printing device.

20. The system of claim 13, wherein the color image forming device comprises an image-on-image color forming device.

21. The system of claim 13, wherein the color image forming device comprises a xerographic image producing device.

* * * * *